United States Patent [19]

Westphal et al.

[11] Patent Number: 4,670,548
[45] Date of Patent: Jun. 2, 1987

[54] SULFO-GROUP-CONTAINING TRISAZO DYESTUFFS

[75] Inventors: Jochen Westphal, Düsseldorf; Hermann Henk, Köln, both of Fed. Rep. of Germany

[73] Assignee: Bayer Aktiengesellschaft, Leverkusen, Fed. Rep. of Germany

[21] Appl. No.: 133,072

[22] Filed: Mar. 24, 1980

[30] Foreign Application Priority Data

Apr. 15, 1979 [DE] Fed. Rep. of Germany ....... 2915214

[51] Int. Cl.$^4$ .............................................. C09B 31/16
[52] U.S. Cl. ..................................... 534/809; 534/811
[58] Field of Search ........................ 260/169, 173, 166

[56] References Cited

U.S. PATENT DOCUMENTS

| 648,623 | 5/1900 | Israel et al. | 260/169 |
| 920,151 | 5/1909 | Jordan et al. | 260/173 |
| 1,010,433 | 12/1911 | Jordan et al. | 260/173 |
| 1,014,633 | 1/1912 | Bergdolt | 260/169 |
| 1,180,985 | 4/1916 | Dedichen et al. | 260/166 |
| 1,602,991 | 10/1926 | Schweitzer | 260/169 |
| 1,856,211 | 5/1932 | Fellmer et al. | 260/173 |
| 2,169,152 | 8/1939 | Kaiser | 260/173 |
| 2,171,364 | 8/1939 | Hannum et al. | 260/169 |
| 2,182,721 | 12/1939 | Conzetti | 260/169 |
| 2,252,824 | 8/1941 | Winkeler et al. | 260/173 |
| 2,421,553 | 6/1947 | Felix et al. | 260/169 |
| 2,435,356 | 2/1949 | Kaiser | 260/173 |
| 2,794,798 | 6/1957 | Durig | 260/173 |

FOREIGN PATENT DOCUMENTS

| 741468 | 9/1943 | Fed. Rep. of Germany | 260/169 |
| 395960 | 3/1909 | France | 260/169 |
| 793459 | 1/1936 | France | 260/169 |
| 202734 | 1/1939 | Switzerland | 260/169 |
| 202735 | 1/1939 | Switzerland | 260/169 |
| 263529 | 2/1950 | Switzerland | 260/173 |
| Ad.3654 | of 1903 | United Kingdom | 260/169 |

OTHER PUBLICATIONS

*Colour Index*, First Ed., 1924, C.I. No. 534, p. 139.
*Colour Index*, Third Ed., 1971, vol. 4, pp. 4314–4315, C.I. No. 34005, No. 34010, No. 34020, No. 34025.

Primary Examiner—Paul F. Shaver
Attorney, Agent, or Firm—Sprung Horn Kramer & Woods

[57] ABSTRACT

Water-soluble dyestuffs of the formula

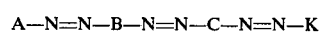

wherein
A denotes sulphophenyl or sulphonaphthyl, which are optionally further substituted,
B denotes sulpho-1,4-naphthylene, which is optionally further substituted,
C denotes 1,4-phenylene or 1,4-naphthylene, which are optionally further substituted, and
K denotes the radical of an optionally functionally modified coupling component of the hydroxybenzene series, aminobenzene series, aminopyrazole series, pyridone series or acetoacetic acid arylide series, or of barbituric acid or citrazinic acid, and their use for dyeing nitrogen-containing fibre materials, such as wool and polyamide, and for dyeing leather.

1 Claim, No Drawings

SULFO-GROUP-CONTAINING TRISAZO DYESTUFFS

The present invention relates to water-soluble dyestuffs of the formula

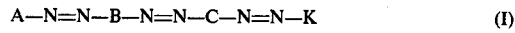

$$A-N=N-B-N=N-C-N=N-K \quad (I)$$

wherein
- A denotes sulphophenyl or sulphonaphthyl, which are optionally further substituted,
- B denotes sulpho-1,4-naphthylene, which is optionally further substituted,
- C denotes 1,4-phenylene or 1,4-naphthylene, which are optionally further substituted, and
- K denotes the radical of an optionally functionally modified coupling component of the hydroxybenzene series, aminobenzene series, aminopyrazole series, pyridone series or acetoacetic acid arylide series, or of barbituric acid or citrazinic acid.

Examples of suitable substituents for A, B and C are halogen, such as Cl and Br, alkyl, in particular optionally substituted $C_1$-$C_4$-alkyl, such as methyl, ethyl, hydroxyethyl and cyanoethyl, alkoxy, in particular optionally substituted $C_1$-$C_4$-alkoxy, such as methoxy, ethoxy and methoxyethoxy, nitro, cyano, alkylsulphonyl, in particular optionally substituted $C_1$-$C_4$-alkylsulphonyl, optionally N-mono- or -di-substituted carbamoyl or sulphamoyl, such as N-mono- and N,N-di-alkylcarbamoyl and N-mono- and N,N-di-alkylsulphamoyl, $C_1$-$C_4$-alkylcarbonylamino, carboxyl, ureido, $C_1$-$C_4$-alkoxycarbonyl, optionally substituted phenyl- or naphthyl-azo and sulpho.

The alkyl and alkoxy groups are preferably those with 1-4C atoms which can be further substituted, in particular by halogen, hydroxyl, $C_1$-$C_4$-alkoxy, cyano or acyloxy.

Acyl radicals are, in particular, alkyl- or aryl-carbonyl or -sulphonyl radicals, such as acetyl, propionyl, methylsulphonyl, benzenesulphonyl and p-toluenesulphonyl.

Particularly preferred alkoxy groups are methoxy, ethoxy and methoxyethoxy.

Preferred radicals A are 2-, 3- or 4-sulphophenyl, 2,4- or 2,5-disulphophenyl, 2-methoxy-5-sulphophenyl, 4-(4'-sulphophenylazo)-phenyl, 2,4'-disulpho-4-phenylazophenyl, 4-nitro-2-sulpho-phenyl, 2-, 3-, 4-, 5-, 6-, 7- or 8-sulphonaphth-1-yl, 2,4-, 3,6-, 3,7-, 3,8-, 4,6-, 4,7-, 4,8-, 5,7- or 6,8-disulphonaphth-1-yl, 2,4,6-, 2,4,7-, 3,6,8- or 4,6,8-trisulphonaphth-1-yl, 1-, 5-, 6-, 7- or 8-sulphonaphth-2-yl, 3,6-, 3,7-, 4,8-, 5,7- or 6,8-disulphonaphth-2-yl and 1,5,7-, 3,6,8- or 4,6,8-trisulphonaphth-2-yl.

The sulphonic acid radical in the naphthylene ring B in the formula I is preferably in the 6-position or 7-position. Technical grade mixtures of the 6-sulphonic acid and the 7-sulphonic acid are also particularly suitable.

Preferred phenylene or naphthylene radicals C are 1,4-phenylene, 2-methyl-1,4-phenylene, 2-acetamino-1,4-phenylene, 2-acetamino-5-methoxy-1,4-phenylene, 2-methyl-5-methoxy-1,4-phenylene, 1,4-naphthylene and 6- or 7-sulpho-1,4-naphthylene.

K preferably represents 4-hydroxy-phenyl, 4-hydroxy-3-carboxy-phenyl, 2-hydroxy-5-methyl-phenyl, 2,4- or 2,6-dihydroxyphenyl, 2-hydroxy-4-phenylaminophenyl, [di-alkyl(in particular methyl or ethyl)-amino]phenyl or 4-diethylamino-2-acetylaminophenyl.

If K is derived from an acetoacetic acid arylide, preferred radicals are to be understood as those of the acetoacetates of aniline, o-, m- or p-toluidine or o-, m- or p-anisidine, and sulphonic acids thereof.

If K is derived from an aminopyrazole, preferred radicals are to be understood as those of 5-amino-3-methyl-1-phenyl-pyrazole and its 3'- or 4'-sulphonic acid.

Preferred radicals K of the pyridone series are those of 1,4-dialkyl (such as methyl or ethyl)-5-cyano-2-hydroxy-pyrid-6-ones.

Preferred radicals K are furthermore 2,4,6-trihydroxy-pyrimidin-5-yl and 2,6-dihydroxy-4-carboxypyrid-5-yl, which are derived from barbituric acid and citrazinic acid respectively.

Preferred dyestuffs are those of the formula wherein
- n denotes 1, 2 or 3,
- $R_1$ denotes H, $C_1$-$C_4$-alkyl, $C_1$-$C_4$-alkoxy and acylamino,
- $R_2$ denotes H, $C_1$-$C_4$-alkyl and $C_1$-$C_4$-alkoxy,
- $R_3$ denotes H, $C_1$-$C_4$-alkyl, hydroxyl and acylamino,
- $R_4$ denotes H, $C_1$-$C_4$-alkyl, $C_1$-$C_4$-alkoxy and carboxyl and
- $R_5$ denotes H, hydroxyl, mono-$C_1$-$C_4$-alkylamino, di-$C_1$-$C_4$-alkylamino and mono-arylamino, and wherein alkyl and alkoxy also contain customary substituents but are preferably unsubstituted and acylamino preferably represents $C_1$-$C_4$-alkylcarbonylamino, $C_1$-$C_4$-alkylsulphonylamino or optionally substituted phenylcarbonylamino or phenylsulphonylamino.

Particularly preferred dyestuffs are those of the formulae

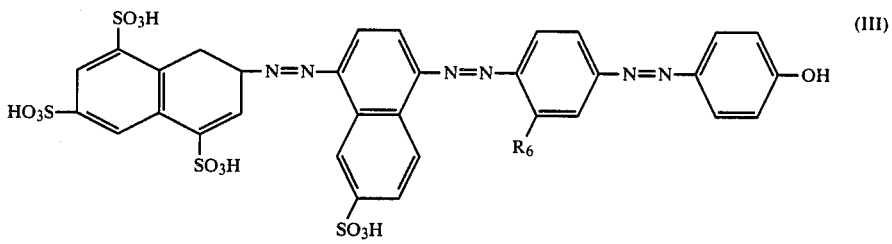
(III)

and

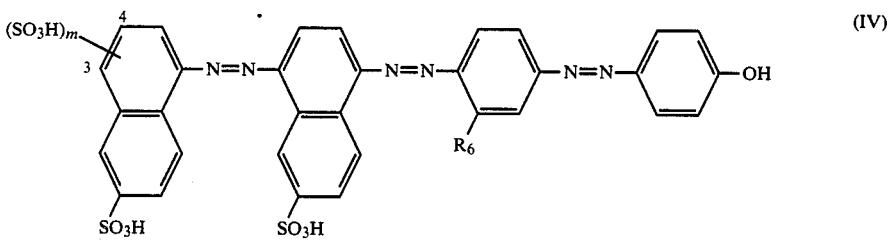
(IV)

wherein
m denotes 0 or 1 and
$R_6$ denotes H, $CH_3$ or $NHCOCH_3$.

Dyestuffs of the formula I are preferably obtained by diazotisation reactions and coupling reactions, and it is frequently possible to vary the sequence of linking the components, as is known in azo chemistry. In one of the methods of preparing dyestuffs of the formula I, a diazonium salt of the amine V

A—NH$_2$ (V)

in particular of

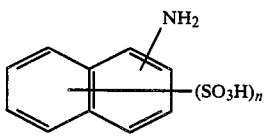
(Va)

is used as the starting material and is coupled to a naphthylamine VI

B—NH$_2$ (VI)

in particular

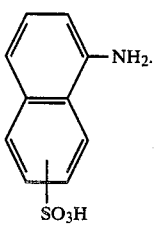
(VIa)

The monoazo dyestuff thus obtained is diazotised further and the diazotisation product is reacted with an amine VII

C—NH$_2$ (VII)

in particular

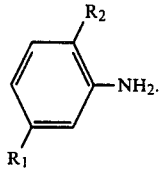
(VIIa)

After diazotising the coupling product, the diazotisation product is finally coupled with VIII

K—H (VIII).

The dyestuffs obtainable by the processes described above or by similar processes can be subjected to further reactions customary for dyestuffs, for example diazotisation of primary aromatic amino groups and reaction of the diazotisation products with further coupling components, or reaction of dyestuffs with positions in which coupling can take place, with diazonium salts. Tris-, tetrakis- or poly-azo dyestuffs of the formula I which formally carry azobenzene, benzeneazonaphthalene or naphthalene-azonaphthalene substituents are thus obtained. The sequence of the reactions can be varied within a wide range, as is known in azo chemistry.

Metallisable dyestuffs of the formula I can be treated with metal donor agents, in particular with salts of chromium, cobalt, copper, iron or nickel, oxidising agents being added if necessary. Dyestuffs which contain reducible groups, in particular nitro groups, can be reduced.

Dyestuffs which contain acylatable or alkylatable groups, for example hydroxyl groups or amino groups, in K can be acylated or alkylated and dyestuffs which can be sulphonated can be subjected to sulphonation with chlorosulphonic acid, oleum or sulphur trioxide.

The new dyestuffs are suitable for dyeing nitrogen-containing fibre materials, such as wool and polyamide, and for dyeing leather.

EXAMPLE 1

1 mol of 2-aminonaphthalene-4,6,8-trisulphonic acid is suspended in 1,600 ml of ice/water and diazotised with 230 ml of 4.35N sodium nitrite solution. The mixture is subsequently stirred for 0.5 hour and the excess of nitrite is then destroyed with a little amidosulphonic acid solution.

750 g of ice and 1 mol of 1-aminonaphthalene-6-sulphonic acid are added to the suspension of the diazonium salt. The pH is adjusted to 2 in the course of about 40 minutes with 630 ml of 20% strength sodium hydroxide solution and the mixture is subsequently stirred for 30 minutes.

500 g of ice and 140 ml of 28% strength hydrochloric acid are added to the monoazo dyestuff. The dyestuff is diazotised with 230 ml of 4.35N sodium nitrite solution in the course of 10–15 minutes. After about 0.5 hour, the excess of nitrite is destroyed with amidosulphonic acid.

500 g of ice are added to the diazonium salt, and 1 mol of m-toluidine is added in the course of 15 minutes. A pH value of 3 is established with 80 ml of 20% strength sodium hydroxide solution in the course of about 2 hours.

1.5 kg of ice and 210 ml of 28% strength hydrochloric acid are added and the coupling product is diazotised with 230 ml of 4.35N sodium nitrite solution. After 0.5 hour, the excess of nitrite is removed with a little amidosulphonic acid.

After adding 1 mol of phenol, the pH is adjusted to 8 in the course of 0.5 hour with about 400 ml of 20% strength sodium hydroxide solution and this pH is maintained for 3 hours. The product is salted out, filtered off and dried in vacuo.

The dyestuff which, in the form of the free acid, corresponds to the formula

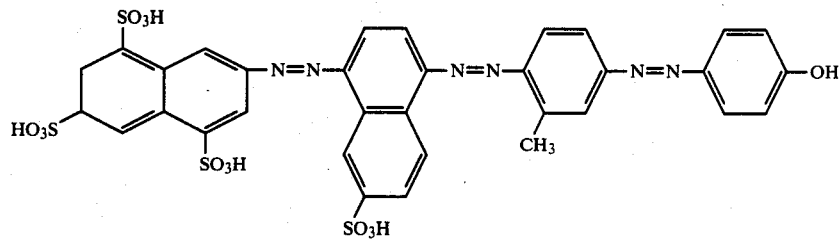

dyes wool, polyamide and leather in brilliant reddish-tinged brown shades.

Further valuable brown dyestuffs, for wool, polyamide and leather, of the formula I are obtained when, in Example 1, 2-aminonaphthalene-4,6,8-sulphonic acid is replaced by A, 1-aminonaphthalene-6-sulphonic acid is replaced by B, m-toluidine is replaced by C and phenol is replaced by K; A, B, C and K being listed in the following table.

TABLE

| Example | A | B | C | K |
|---|---|---|---|---|
| 2 | 2-amino-naphthalene-4,8-disulphonic acid | 1-aminonaphthalene-6-sulphonic acid | m-toluidine | phenol |
| 3 | 2-amino-naphthalene-4,8-disulphonic acid | 1-aminonaphthalene-6-sulphonic acid | 3-acetamino-aniline | " |
| 4 | 2-amino-naphthalene-4,8-disulphonic acid | 1-aminonaphthalene-6-sulphonic acid | aniline | " |
| 5 | 2-amino-naphthalene-4,8-disulphonic acid | 1-aminonaphthalene-7-sulphonic acid | m-toluidine | " |
| 6 | 2-amino-naphthalene-4,8-disulphonic acid | 1-aminonaphthalene-6/7-sulphonic acid | " | " |
| 7 | 2-amino-naphthalene-4,8-disulphonic acid | 1-aminonaphthalene-6/7-sulphonic acid | aniline | salicylic acid |
| 8 | 2-amino-naphthalene-4,8-disulphonic acid | 1-aminonaphthalene-6/7-sulphonic acid | 3-acetamino-aniline | " |
| 9 | 2-aminonaphthalene-4,6,8-trisulphonic acid | 1-aminonaphthalene-6-sulphonic acid | 3-acetamino-aniline | " |
| 10 | 2-aminonaphthalene-4,6,8-trisulphonic acid | 1-aminonaphthalene-6-sulphonic acid | aniline | p-cresol |
| 11 | 2-aminonaphthalene-4,6,8-trisulphonic acid | 1-aminonaphthalene-6/7-sulphonic acid | m-toluidine | phenol |
| 12 | 2-aminonaphthalene-4,6,8-trisulphonic acid | 1-aminonaphthalene-6/7-sulphonic acid | aniline | " |
| 13 | 2-aminonaphthalene-4,6,8-trisulphonic acid | 1-aminonaphthalene-6/7-sulphonic acid | 3-acetamino-naphthalene | " |
| 14 | 2-aminonaphthalene-4,6,8-trisulphonic acid | 1-aminonaphthalene-6/7-sulphonic acid | 3-acetamino-naphthalene | salicylic acid |
| 15 | 4-amino-azobenzene-2,4'-disulphonic acid | 1-aminonaphthalene-6-sulphonic acid | 3-acetamino-naphthalene | phenol |
| 16 | 4-amino-azobenzene-2,4'-disulphonic acid | 1-aminonaphthalene-6-sulphonic acid | aniline | " |
| 17 | 4-amino-azobenzene-2,4'-disulphonic acid | 1-aminonaphthalene-6-sulphonic acid | m-toluidine | " |
| 18 | 4-amino-azobenzene-2,4'-disulphonic acid | 1-aminonaphthalene-6-sulphonic acid | aniline | salicylic acid |

TABLE-continued

| Example | A | B | C | K |
|---|---|---|---|---|
| 19 | 2-aminonaphthalene-4,6,8-trisulphonic acid | 1-aminonaphthalene-6-sulphonic acid | " | 3-hydroxy-diphenylamine |
| 20 | 2-aminonaphthalene-4,6,8-trisulphonic acid | 1-aminonaphthalene-6-sulphonic acid | m-toluidine | barbituric acid |
| 21 | 2-aminonaphthalene-4,6,8-trisulphonic acid | 1-aminonaphthalene-6-sulphonic acid | aniline | citrazinic acid |
| 22 | 2-aminonaphthalene-4,6,8-trisulphonic acid | 1-aminonaphthalene-6-sulphonic acid | " | 3-diethylamino-acetanilide |
| 23 | 2-aminonaphthalene-4,6,8-trisulphonic acid | 1-aminonaphthalene-6-sulphonic acid | m-toluidine | toluidine acetoacetate |
| 24 | 2,4-disulphoaniline | 1-aminonaphthalene-6-sulphonic acid | aniline | phenol |
| 25 | " | 1-aminonaphthalene-6-sulphonic acid | m-toluidine | " |
| 26 | " | 1-aminonaphthalene-6-sulphonic acid | " | salicylic acid |
| 27 | " | 1-aminonaphthalene-6-sulphonic acid | m-aminoacet-anilide | p-cresol |
| 28 | 1-aminonaphthalene-6-sulphonic acid | 1-aminonaphthalene-6-sulphonic acid | m-toluidine | phenol |
| 29 | 1-aminonaphthalene-6/7-sulphonic acid | 1-aminonapthalene-6/7-sulphonic acid | aniline | " |
| 30 | 1-aminonaphthalene-6/7-sulphonic acid | 1-aminonaphthalene-6/7-sulphonic acid | " | p-cresol |
| 31 | 1-aminonaphthalene-6/7-sulphonic acid | 1-aminonaphthalene-6/7-sulphonic acid | m-toluidine | salicylic acid |
| 32 | 1-aminonaphthalene-6/7-sulphonic acid | 1-aminonaphthalene-6/7-sulphonic acid | 1-amino-naphthalene | phenol |
| 33 | 1-aminonaphthalene-6/7-sulphonic acid | 1-aminonaphthalene-6/7-sulphonic acid | 1-amino-naphthalene | p-cresol |
| 34 | 4-aminoaniline-1-sulphonic acid | 1-aminonaphthalene-6-sulphonic acid | aniline | " |
| 35 | 4-aminoaniline-1-sulphonic acid | 1-aminonaphthalene-6-sulphonic acid | m-toluidine | " |
| 36 | 4-aminoaniline-1-sulphonic acid | 1-aminonaphthalene-6-sulphonic acid | " | salicylic acid |
| 37 | 4-aminoaniline-1-sulphonic acid | 1-aminonaphthalene-6-sulphonic acid | 3-aminoacet-anilide | phenol |
| 38 | 4-aminoaniline-1-sulphonic acid | 1-aminonaphthalene-6-sulphonic acid | m-toluidine | 3-hydroxy-diphenylamine |

We claim:
1. Dyestuffs of the formula

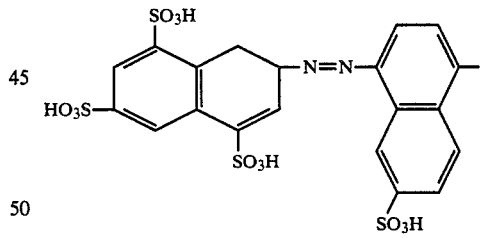

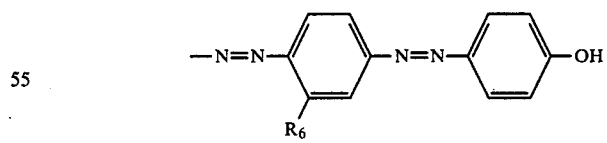

wherein
$R_6$ denotes H, $CH_3$ or $NHCOCH_3$.

UNITED STATES PATENT AND TRADEMARK OFFICE
CERTIFICATE OF CORRECTION

PATENT NO. : 4,670,548
DATED : June 2, 1987
INVENTOR(S) : Jochen Westphal, et al.

It is certified that error appears in the above-identified patent and that said Letters Patent is hereby corrected as shown below:

Title Page, under "Foreign Application Priority Data"  Delete "Apr. 15, 1979" and substitute --Apr. 14, 1979--

Title Page, under "US Patent Documents", line 13  Delete "2/1949" and substitute --2/1948--

Signed and Sealed this

Twenty-sixth Day of April, 1988

Attest:

DONALD J. QUIGG

Attesting Officer

Commissioner of Patents and Trademarks